United States Patent [19]
Kurio et al.

[11] Patent Number: 4,765,291
[45] Date of Patent: Aug. 23, 1988

[54] ENGINE LUBRICATING SYSTEM

[75] Inventors: Noriyuki Kurio; Hiroshi Yoshimi, both of Hiroshima, Japan

[73] Assignee: Mazda Motor Corporation, Japan

[21] Appl. No.: 5,073

[22] Filed: Jan. 20, 1987

[30] Foreign Application Priority Data

Jan. 20, 1986 [JP] Japan .................. 61-10854

[51] Int. Cl.$^4$ .............................. F01M 1/00
[52] U.S. Cl. ..................... 123/196 R; 123/73 AD; 418/99
[58] Field of Search ............. 123/196 R, 73 AD; 418/99, 88, 97

[56] References Cited

U.S. PATENT DOCUMENTS

| | | | |
|---|---|---|---|
| 3,245,386 | 4/1966 | Bentele | 418/99 |
| 3,834,843 | 9/1974 | Stoltman et al. | 418/88 |
| 3,834,844 | 9/1974 | Morgan | 418/85 |
| 4,463,718 | 8/1984 | Griffith | 418/97 |
| 4,527,965 | 7/1985 | Markley | 418/97 |

FOREIGN PATENT DOCUMENTS 56-162204 12/1981 Japan .
60-3201 1/1985 Japan .

Primary Examiner—E. Rollins Cross
Attorney, Agent, or Firm—Gerald J. Ferguson, Jr.

[57] ABSTRACT

In an engine lubricating system in which a measured amount of lubricating oil is supplied to the combustion chamber of an engine by a metering oil pump so that a larger amount of lubricating oil is supplied to the combustion chamber when the engine load is heavy than when the engine load is light. The amount of the lubricating oil to be supplied to the combustion chamber per unit engine revolution is corrected to be larger at high engine speed than at low engine speed.

14 Claims, 7 Drawing Sheets

ENGINE LUBRICATING SYSTEM

BACKGROUND OF THE INVENTION

1. Field of the Invention

This invention relates to an engine lubricating system, and more particularly to a system for controlling the amount of lubricant to be supplied to the combustion chamber in a Wankel engine, a two-cycle engine or the like.

2. Description of the Prior Art

As disclosed in Japanese Unexamined Utility Model Publication No. 60(1985)-3201, for instance, in a Wankel engine and the like, a measured amount of lubricating oil is supplied to the combustion chamber by a metering oil pump to lubricate the moving parts in the housing separately from the main lubricating system. In such a lubricating system, the amount of oil to be supplied to the combustion chamber is controlled by the metering oil pump. That is, the metering oil pump generally discharges lubricating oil in synchronization with engine revolution by way of a plunger driven by the engine output shaft, and the stroke of the plunger is controlled by a cam provided on a control pin which is rotated in response to the throttle valve, thereby controlling the amount of lubricating oil to be discharged from the metering oil pump per unit engine revolution.

In the conventional system, the oil discharge rate of the metering oil pump (the amount of lubricating oil to be discharged from the metering oil pump per unit engine revolution) changes solely according to the engine load (the throttle opening) irrespective of the engine speed. However, the lubricating oil requirement per unit engine revolution changes with the engine speed. That is, since the temperature of the moving parts rises as the engine speed increases, the lubricating oil requirement increases with increase in the engine speed. Accordingly, if the oil discharge rate of the oil pump is set to meet the lubricating oil requirement at a low engine speed, lubricating oil will be insufficient during a high speed operation of the engine, and on the other hand, if the oil discharge rate is set to meet the lubricating oil requirement at a high engine speed, lubricating oil will be excessive during a low speed operation of the engine.

SUMMARY OF THE INVENTION

In view of the foregoing observations and description, the primary object of the present invention is to provide an engine lubricating system in which the proper amount of lubricating oil can be supplied to the combustion chamber irrespective of the engine operating condition.

In accordance with the present invention, there is provided an engine lubricating system in which a measured amount of lubricating oil is supplied to the combustion chamber of an engine by a metering oil pump so that a larger amount of lubricating oil is supplied to the combustion chamber when the engine load is heavy than when the engine load is light, characterized by having a lubricating oil supply rate correction means which corrects the amount of the lubricating oil to be supplied to the combustion chamber per unit engine revolution to be larger at high engine speed than at low engine speed.

DESCRIPTION OF THE PREFERRED EMBODIMENT

Figure 1:
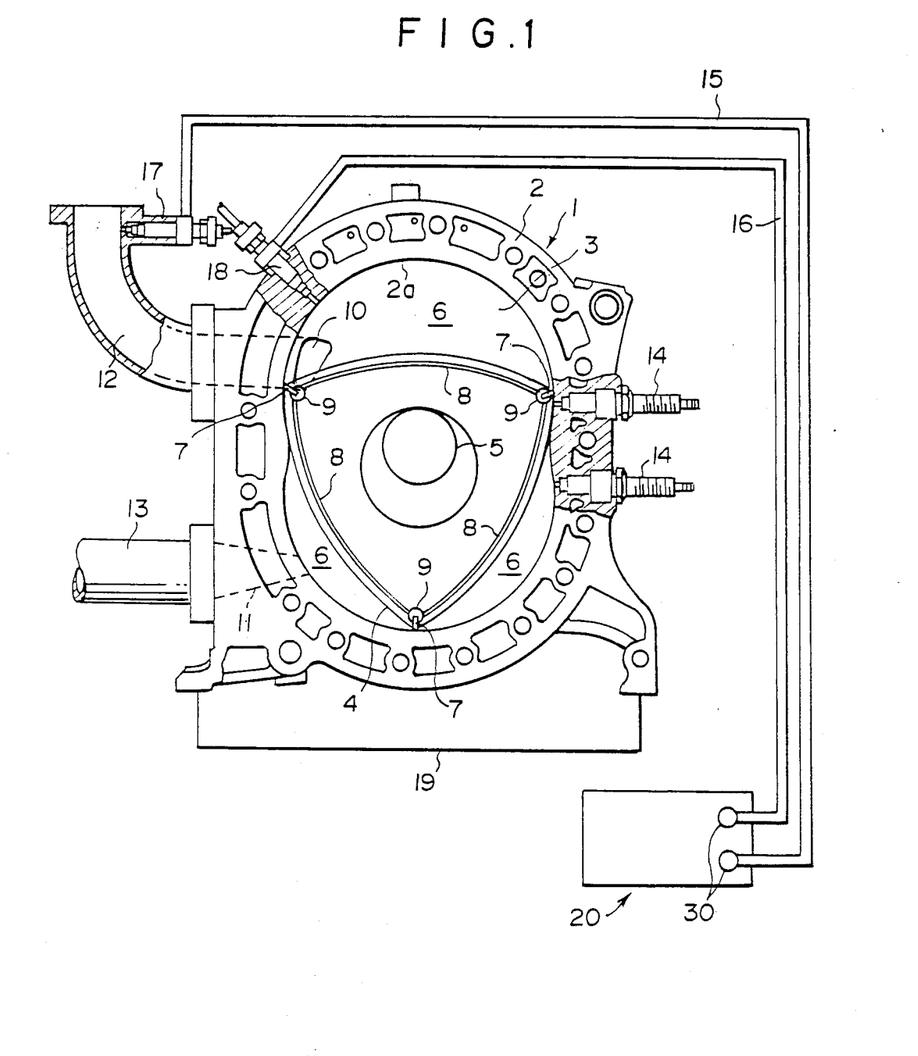
FIG. 1 is a schematic view showing an engine lubricating system in accordance with an embodiment of the present invention.

In FIG. 1, a casing 1 of a Wankel engine comprises a rotor housing 2 having a trochoidal inner surface 2a, and a pair of side housings 3 disposed on opposite sides of the rotor housing 2. A triangular rotor 4 supported on an eccentric shaft 5 rotates in the casing 1, and forms three chambers (combustion chambers) 6 in the casing 1. As the rotor 4 rotates, intake, compression, power and exhaust strokes take place. On each apex of the rotor 4 is mounted an apex seal 7 which is in contact with the inner surface 2a of the rotor housing 2. Further, a side seal 8 is mounted on each side of the rotor 4 to be in contact with the inner surface of the side housing 3, and each of a pair of corner seals 9 is attached to opposite sides of each apex of the rotor 4.

The casing 1 is provided with an intake port 10 which is communicated with the chamber 6 in the intake stroke through the side housing 3 and an exhaust port 11 which is communicated with the chamber 6 in the exhaust stroke through the rotor housing 2. An intake passage 12 and an exhaust passage 13 are respectively connected to the intake port 10 and the exhaust port 11. Two spark plugs 14 are mounted on the rotor housing 2 in a predetermined position.

A lubricating system for lubricating the parts in the casing 1 on which the apex seals 7 and the like slide includes first and second oil supply passages 15 and 16, and a metering oil pump 20 which measures lubricating oil fed thereto from an oil pan 19 by an oil pump (not shown) and discharges the measured amount of lubricating oil to the oil supply passages 15 and 16. The first oil supply passage 15 opens to the intake passage 12 at the downstream end by way of a first oil supply nozzle 17 to supply the lubricating oil to the chamber 6 by way of the intake passage 12. The second oil supply passage 16 opens in the inner surface 2a of the rotor housing 2 by way of a second oil supply nozzle 18 to directly supply the lubricating oil to the chamber 6.

As shown in detail in FIGS. 2 to 5, the metering oil pump 20 comprises upper and lower plungers 21 for measuring and discharging the lubricating oil, and a control pin 22 having a pair of cams 23 for controlling the stroke of the plungers 21. In this particular embodiment, the upper and lower plungers 21 respectively discharge the lubricating oil to the first and second oil supply passages 15 and 16 and accordingly the control pin 22 is provided with a pair of cams 23. However, a single plunger may be employed to discharge the lubricating oil through a plurality of discharge ports.

Figure 2:
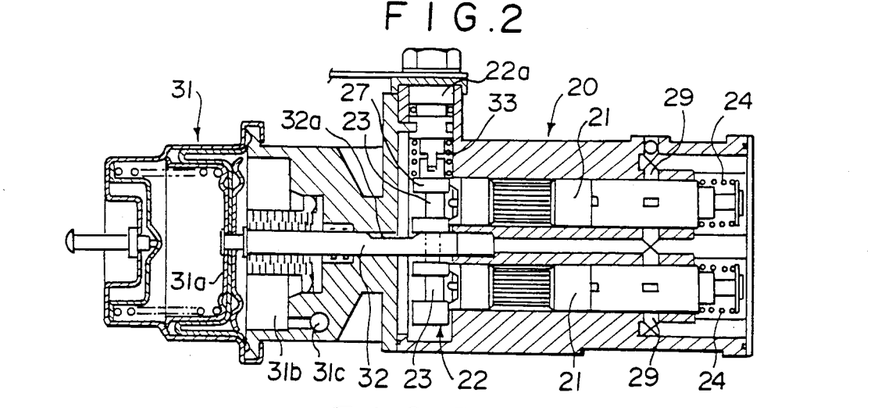
FIG. 2 is a cross-sectional view of the metering oil pump employed in the engine lubricating system of FIG. 1.

The plungers 21 are rotated, driven by a driving worm 25 while being urged toward the control pin 22 by springs 24. The driving worm 25 is rotated in synchronization with the engine output shaft. Two projections 26 are provided, diametrically opposed to each other, one each on the end face of each plunger 21 remote from the spring 24, and a central projection 28 is provided between the projections 26 on the same end face of each plunger 21. As each plunger 21 is rotated, the projections 26 are engaged with large diameter base portions 27 (circular in shape) and disengaged therefrom depending on the angular position thereof, and when the projections 26 are disengaged from the large diameter base portions 27, the central projection 28 abuts against the cam 23 under the force of the spring 24, whereby the plunger 21 is reciprocated. By the rotation and the reciprocating motion of the plungers 21, the lubricating oil is taken through inlets 29 and discharged through outlets 30 (FIG. 1) alternately in synchronization with engine revolution.

The cams 23 are rotated by an angle according to the opening of the throttle valve (not shown) to change the stroke of the plungers 21, thereby changing the oil discharge rate. A part of the control pin 22 is axially moved by an actuator 31 and a slide lever 32 according to the engine speed to change the stroke of the plungers 21.

Figure 3:
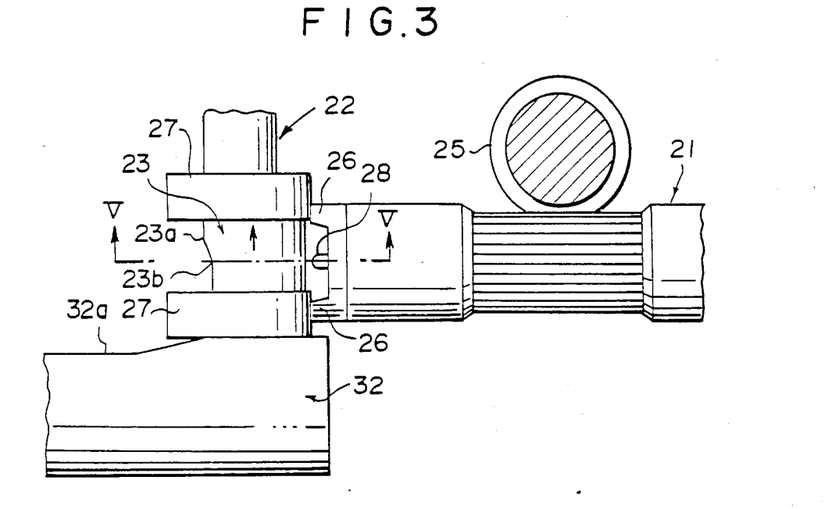
FIG. 3 is an enlarged view showing the relation between the control pin and the plunger at high engine speed.
Figure 4:
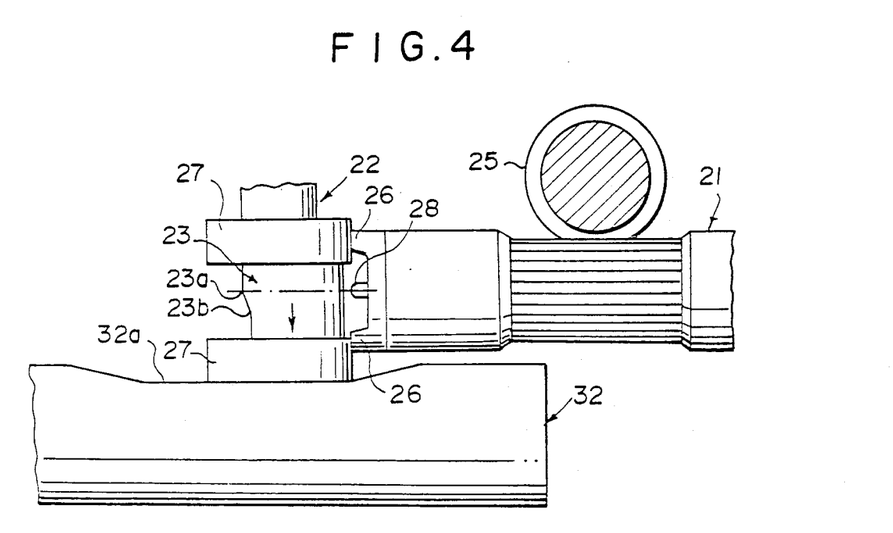
FIG. 4 is an enlarged view showing the relation between the control pin and the plunger at low engine speed.
Figure 5:
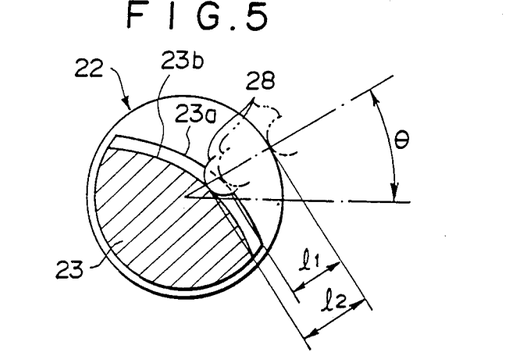
FIG. 5 is a cross-sectional view taken along line V—V in FIG. 3.
Figure 6:
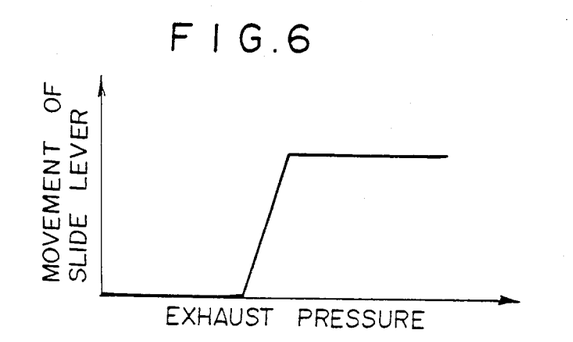
FIG. 6 is a view showing the relation between the amount of sliding movement of the slide lever and the exhaust pressure.

That is, the control pin 22 comprises a first part having the cams 23 and the base portions 27, and a second part 22a which is moved in response to the throttle valve, and the first part is connected to the second part 22a for axial movements and is urged downward (as seen in FIG. 2) under the force of a spring 33. Each cam 23 is shaped in cross section so that the difference in height between the outer surface of the large diameter base potion 27 and the outer surface of the cam 23, which determines the stroke of the plunger 21, varies both in the peripheral direction thereof (FIG. 5) and in the axial direction thereof (FIGS. 3 to 5). The difference in height is larger at the lower portion 23b than the upper portion 23a. The slide lever 32 is provided with a recess 32a on the upper surface thereof, and is movable in the direction perpendicular to the control pin 22. The lower face of one of the large diameter base portions 27 rests on the upper surface of the slide lever 32 and one end of the slide lever 32 is connected to a diaphragm 31a of the actuator 31 which is pressure-responsive. The actuator 31 has a pressure chamber 31b into which exhaust pressure is introduced through an exhaust pressure introduction port 31c. The diaphragm 31a is deflected by the exhaust pressure to move the slide lever 32 according to the exhaust pressure as shown in FIG. 6. That is, when the exhaust pressure is high, i.e., when the engine speed is high, the recess 32a of the slide lever 32 is out of alignment with the base portion 27 as shown in FIG. 3, and on the other hand, when the exhaust pressure is low, i.e., when the engine speed is low, the slide lever 32 is moved to bring the recess 32a into alignment with the base portion 27 as shown in FIG. 4. The pressure for driving the actuator 32 need not be limited to the exhaust pressure but may be the hydraulic pressure in the oil pump not shown, for example.

The operation of the engine lubricating system of this embodiment will be described, hereinbelow.

By virtue of the cross sectional shape of the cams 23 on the control pin 22, when the control pin 22 is rotated in response to change in the throttle opening and the portions of the cams 23 against which the central projections 28 of the plungers 21 abut change, the strokes of the plungers 21 are varied. Thus, the lubricating oil discharge rate is changed according to the engine load. When the engine speed is low and the exhaust pressure is low, the recess 32a on the slide lever 32 is in alignment with the base portion 27 and the control pin 22 is in the lower position in which the central projections 28 abut against the upper portions 23a of the cams 23. On the other hand, when the engine speed is high and the exhaust pressure is high, the recess 32a is out of alignment with the base portion 27 and the control pin 22 is in the upper position in which the central projections 28 abut against the lower portions 23b of the cams 23 as shown in FIG. 3. Accordingly, as shown in FIG. 5, the stroke of the plungers 21 for a given rotating angle $\theta$ by which the control pin 22 is rotated according to the engine load is longer when the engine speed is high than when the engine speed is low, the stroke of the plungers 21 at high engine speed being indicated at $l_2$ and that at low engine speed being indicated at $l_1$.

Thus, the lubricating oil discharge rate is changed according to both the engine load and the engine speed so that the lubricating oil discharge rate is increased as the engine load increases and is larger when the engine speed is high than when the engine speed is low.

Though in the embodiment described above, the lubricating oil discharge rate for a given engine load is changed in two steps according to the engine speed, the rate may be changed in three or more steps, or may be changed continuously according to the engine speed. Further, the means for correcting the lubricating oil discharge rate may be of other various structures than that described above in which the stroke of the plungers 21 is changed according to the engine speed. For example, the lubricating oil discharge rate can be corrected according to the engine speed by inserting between the engine output shaft and the driving worm 25 a mechanism for changing the reduction rate according to the engine speed and by changing the number of rotation and reciprocating movements of the plunger per unit engine revolution.

In the first embodiment described above, the amount of the lubricating oil to be supplied to the chamber 6 by way of the intake passage 12 and the amount of the lubricating oil to be directly supplied to the chamber 6 are controlled by the separate plungers 21 and the cams 23. This arrangement is advantageous in that the ratio of the amount of the oil to be supplied to the intake passage 12 to the amount of the oil to be directly supplied to the chamber 6 can be easily changed and the correction amounts by which the amounts of oil to be supplied to the intake passage 12 and directly to the chamber 6 are corrected according to the engine speed can be separately controlled by using different cams. Further, the first embodiment is advantageous in that since the lubricating oil discharge rate is changed according to the engine load by rotating the cams 23 and according to the engine speed by axially moving the same, the lubricating oil discharge rate can be changed according to both the engine load and the engine speed by solely controlling the cams 23.

Figure 7:
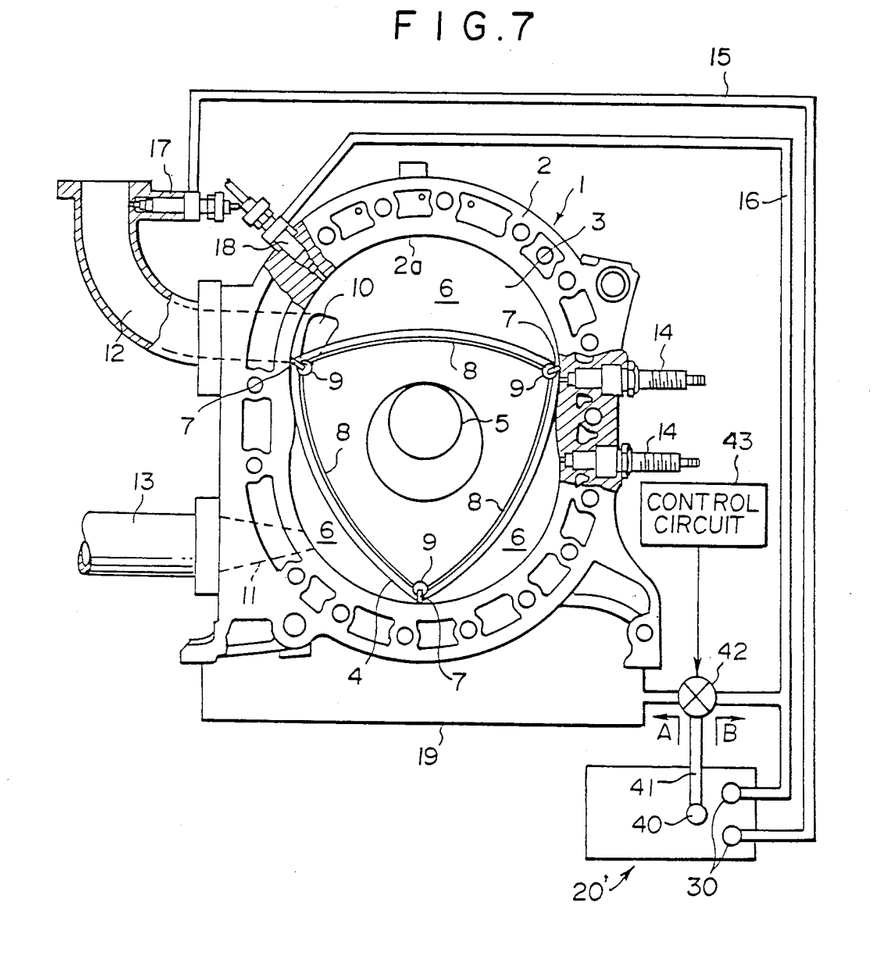
FIG. 7 is a view similar to FIG. 1, but showing another embodiment of the present invention.

Though in the first embodiment, the amount of the lubricating oil to be supplied to the chamber 6 is corrected according to the engine speed by controlling the discharge rate of the metering oil pump, in the second embodiment shown in FIG. 7, the amount of the oil to be supplied to the chamber 6 is corrected by changing the amount of oil actually delivered to the chamber 6 without controlling the discharge rate of the metering oil pump. That is, in FIG. 7, the metering oil pump 20' is of a known structure and the oil discharge rate of the metering oil pump 20' is changed solely according to the engine load irrespective of the engine speed. The metering oil pump 20' is provided with an auxiliary outlet 40 in addition to the outlets 30 (in FIG. 7, the parts analogous to the parts shown in FIG. 1 are given the same reference numerals and will not be described in detail here) for discharging measured amount of oil to the first and second oil supply passages 15 and 16. The auxiliary outlet 40 is connected to the oil pan 19 and the second oil supply passage 16 (for supplying the measured lubricating oil directly to the chamber 6) by way of an auxiliary oil supply passage 41 and a switching valve 42. The switching valve 42 communicates the auxiliary oil supply passage 41 selectively with the oil pan 19 or the second oil supply passage 16 under the control of a control circuit 43.

The control circuit 43 receives a detecting signal representing the operating condition of the engine and controls the switching valve 42 to communicate the auxiliary oil supply passage 41 to the oil pan 19 as shown by arrow A when the engine speed is low and to the second oil supply passage 16 as shown by arrow B when the engine speed is high and when the engine is being accelerated, thereby increasing the amount of the lubricating oil to be supplied to the chamber 6 by way of the second oil supply passage 16 when the engine speed is high and the engine is accelerated.

In the second embodiment, the auxiliary outlet 40 is used solely for correcting the amount of the lubricating oil to be supplied to the chamber 6 according to the engine speed, and the correction characteristics can be freely changed.

Figure 8:
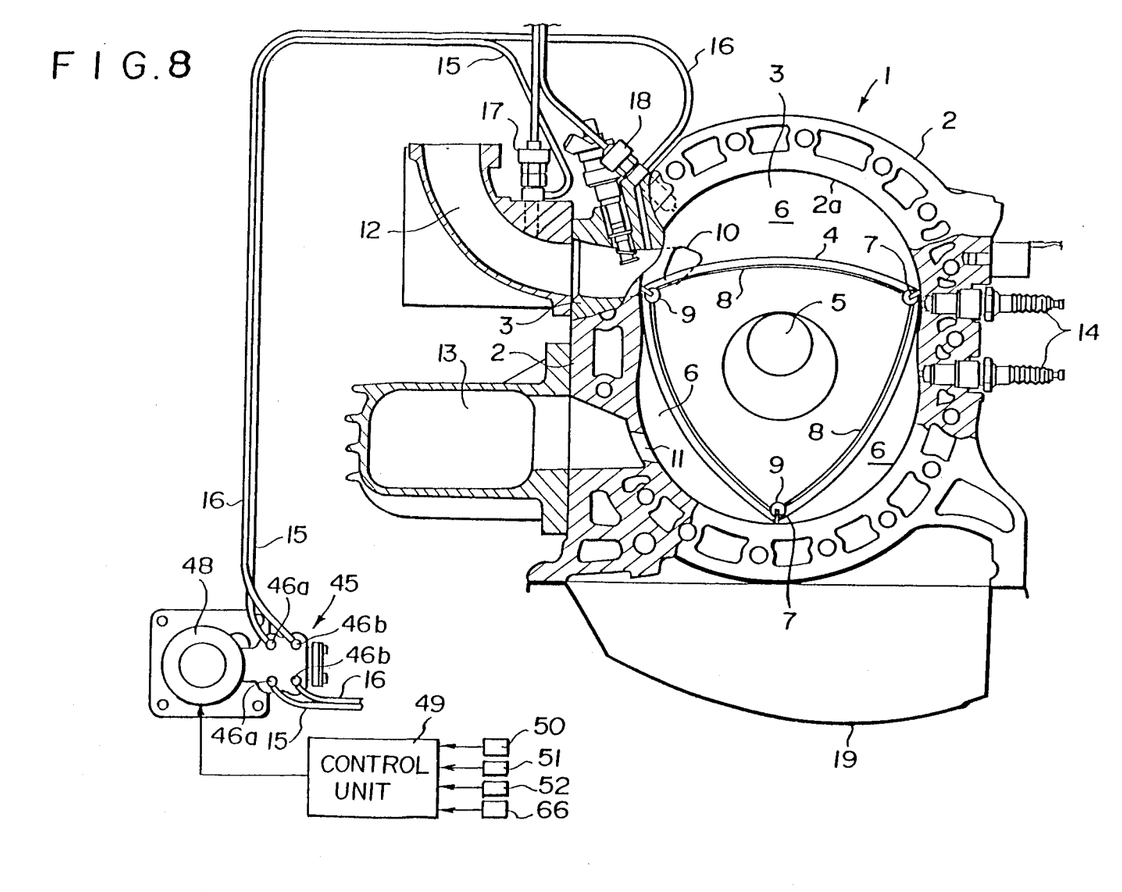
FIG. 8 is a view similar to FIG. 1 but showing still another embodiment of the present invention.

The third embodiment of the present invention in which the amount of the lubricating oil to be supplied to the chamber 6 is continuously controlled according to both the engine load and the engine speed will be described in detail with reference to FIGS. 8 to 12, hereinbelow. The engine in this embodiment has two cylinders the structure of which is substantially the same as that shown in FIG. 1, though only one of them is shown in FIG. 8. In FIG. 8, the parts analogous to the parts shown in FIG. 1 are given the same reference numerals and will not be described here. As clearly shown in FIGS. 9 and 10, the metering oil pump 45 in this embodiment has a pair of first outlets 46a and a pair of second outlets 46b. One of the first outlets 46a is connected to the first oil supply passage 15 of the first cylinder (shown in FIG. 8) and the other first outlet 46a is connected to the first oil supply passage 15 of the second or the other cylinder (not shown). Similarly, one of the second outlets 46b is connected to the second oil supply passage 16 of the first cylinder and the other of the second outlets 46b is connected to the second oil supply passage 16 of the second cylinder.

The oil discharge rate of the metering oil pump 45 is controlled by the position of a control pin 47 which is driven by a stepping motor 48 under the control of a control unit 49. Into the control unit 49 are input signals from an airflow meter 50 for detecting the amount of intake air, an engine speed sensor 51 for detecting the engine rpm, a water temperature sensor 52 for detecting the temperature of the engine coolant and a starter switch 66.

Figure 9:
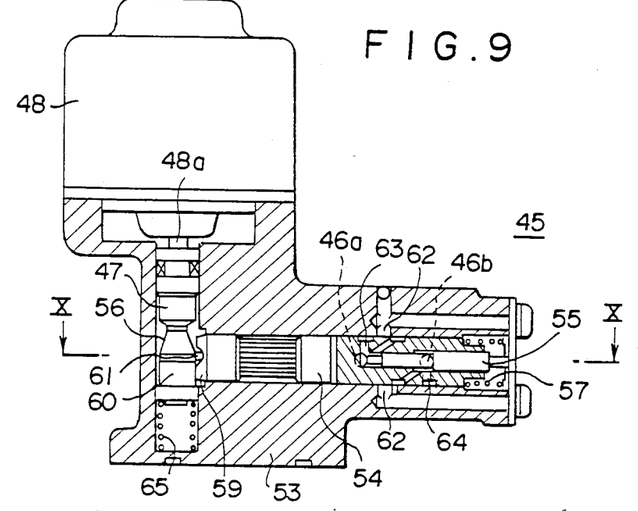
FIG. 9 is a cross-sectional view of the metering oil pump employed in the embodiment shown in FIG. 8.
Figure 10:
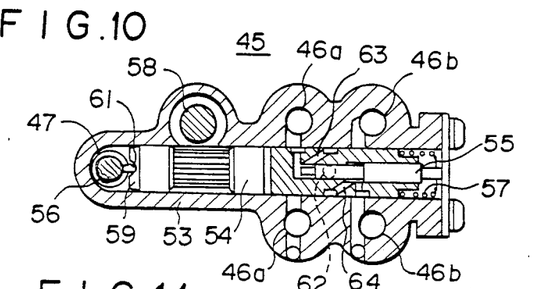
FIG. 10 is a cross-sectional view taken along line X—X in FIG. 9.

As shown in FIGS. 9 and 10, the metering oil pump 45 includes a single plunger 54 accommodated in a pump housing 53 to be movable back and forth. The plunger 54 has a central hole in the rear portion thereof and a pin 55 fixed to the housing 53 is received in the central hole. The control pin 47 is inserted into the pump housing 53 perpendicular to the plunger 54. The control pin 47 has a tapered cam 56 the cross section of which changes in the axial direction of the control pin 47 and the front end of the plunger 54 abuts against the cam 56.

The plunger 54 is urged against the control pin 47 under the force of a spring 57 disposed around the pin 55. Further, the plunger 54 is in mesh with a driving worm 58 to be rotated by the driving worm 58. As rotated by the driving worm 58, the plunger 54 is reciprocated between a position in which projections 59 on the front end thereof abut against a base portion 60 of the control pin 47 and a position in which a central projection 61 on the front end thereof abut against the base portion 60 of the control pin 47. By the rotation and the reciprocating motion of the plunger 54, the lubricating oil is taken through upper and lower inlets 62 by way of a passage 63 and discharged through the outlets 46a and 46b by way of a passage 64 alternately in synchronization with engine revolution. The first outlets 46a are formed on the front side of the plunger 54 and the second outlets 46b are formed on the rear side of the plunger 54.

The control pin 47 is axially moved by the stepping motor 48 which is of a stroke type. The stepping motor 48 has an output shaft 48a which is coaxially disposed with the control pin 47 and is moved back and forth in the longitudinal direction thereof. The control pin 47 is urged by a return spring 65 so that an end face thereof is pressed against the output shaft 48a of the stepping motor 48. That is, the control pin 47 is moved downward (as seen in FIG. 9) to increase the oil discharge rate driven by the stepping motor 48, and is moved upward to reduce the oil discharge rate under the force of the return spring 65. The stepping motor 48 receives a pulse or pulses from the control unit 49 and moves downward the control pin 47 by a predetermined distance for each pulse.

Figure 11:
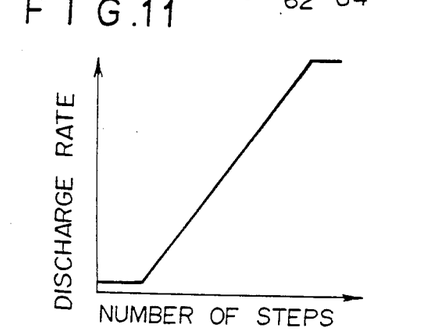
FIG. 11 is a view showing the relation between the number of steps of the stepping motor and the oil discharge rate of the metering oil pump employed in the embodiment shown in FIG. 8.

In the metering oil pump 45, when the control pin 47 is axially moved and the diameter of the portion of the cam 56 against which the central projection 61 of the plunger 54 abuts is changed, the stroke of the plunger 54 is changed, thereby changing the oil discharge rate. The oil discharge rate of the metering oil pump 45 is electrically controlled by the control unit 49 by way of the stepping motor 48. The shape of the cam 56 is selected so that the oil discharge rate of the metering oil pump 45 is related to the number of steps of the stepping motor 48 or the number of the pulses to be input into the stepping motor 48 as shown in FIG. 11.

Figure 12:
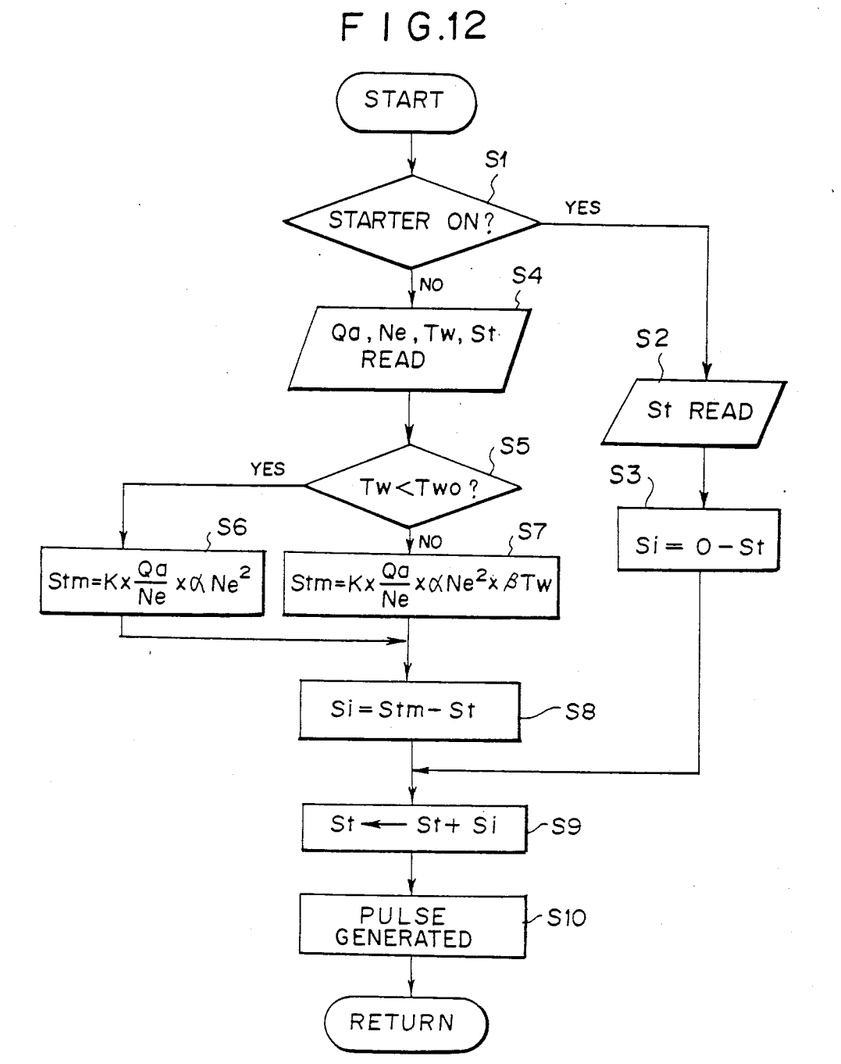
FIG. 12 is a flow chart for illustrating the operation of the control unit in the embodiment shown in FIG. 8.

The operation of the control unit 49 will be described with reference to the flow chart shown in FIG. 12. In FIG. 1, the control unit 49 first determines whether the engine is being started by way of whether the starter switch 66 is on. (Step S1) When it is determined that the engine is being started in the step S1, the step number position (the position of the stepping motor 48 in terms of the number of steps) at present St which has been stored in a register is read in step S2. Then the number of steps Si required for resetting the stepping motor 48 to the position corresponding to the step number zero is calculated in step S3. Thereafter the control unit 49 proceeds to step S9. On the other hand, when it is determined that the engine has been started in the step S1, the amount of intake air Qa, the engine speed Ne and the temperature of engine cooling water Tw detected by the respective sensors, and the step number position at present St are read in step S4.

Then it is determined whether the temperature of the engine cooling water Tw is lower than a preset value Two (step S5). When it is determined that the former is lower than the latter, a target step number Stm is calculated through the following formula. (step S6)

$$Stm = (K \times Qa/Ne) \times aNe^2$$

On the other hand, when it is determined that the former is not lower than the latter, the target step number Stm is calculated through the following formula. (step S7)

$$Stm = (K \times Qa/Ne) \times aNe^2 \times \beta Tw$$

In the formulae, K represents a constant, the value of Qa/Ne corresponds to the engine load, $\alpha$ represents an engine speed correction coefficient and $\beta$ represents a cooling water temperature correction coefficient. In this manner, a base amount of the oil determined according to the engine load is corrected continuously according to the engine speed so that the amount of the lubricating oil to be supplied to the chamber 6 per unit engine revolution is increased as the engine speed increases, and is corrected according to the temperature of the engine cooling water so that the amount of the lubricating oil to be supplied to the chamber 6 is increased with increase in the engine temperature.

Then the number of steps Si by which the stepping motor 48 is to be driven is calculated through the target step number Stm thus obtained and the step number position at present St (step S8). Thereafter in step S9, the step number position at present St is renewed, and then pulses are generated to drive the stepping motor 48 by the number of steps Si determined in the step S8 (step S10).

In this embodiment, since the amount of the lubricating oil is continuously controlled according to both the engine load and the engine speed, optimal lubrication can be effected with a minimum amount of oil. The tapered cam 56 employed in this embodiment is advantageous in view of ease of fabrication and resistance to wear.

Further, as described above, the control pin 47 and the output shaft 48a of the stepping motor 48 are not mechanically connected with each other and the connected pin 47 is arranged to be moved to reduce the oil discharge rate under the force of the return spring 65. If the control pin 47 is connected to the output shaft 48a and the stepping motor 48 is forced to pull upward the control pin 47 while the plunger 54 is moved toward the control pin 47, a large load is exerted on the stepping motor 48 to prevent the stepping motor 48 from being driven precisely according to the pulse signals, thereby adversely affecting the control of the oil discharge rate. This is the reason that the control pin 47 is not mechanically connected to the output shaft 48a of the stepping motor 48. Further, the stroke type stepping motor is advantageous over the rotation type stepping motor in that no reduction gear is needed and the driving system can be arranged compactly, and mounting of the stepping motor is facilitated.

The present invention can be applied also to two-cycle engines in which lubricating oil must be supplied to the combustion chamber for lubrication between the piston and the cylinder wall.

We claim:

1. An engine lubricating system in which a measured amount of lubricating oil is supplied to the combustion chamber of an engine by a metering oil pump so that a larger amount of lubricating oil is supplied to the combustion chamber when the engine load is heavy than when the engine load is light, characterized by having a lubricating oil supply rate correction means which nonlinearly increases the amount of the lubricating oil supplied to the combustion chamber with respect to engine r.p.m. so that the amount of oil supplied per unit engine revolution is greater at high engine speed than at low engine speed.

2. An engine lubricating system as defined in claim 1 in which said lubricating oil is supplied to the combustion chamber directly and by way of an intake passage, and said lubricating oil supply rate correction means corrects the amount of the lubricating oil to be directly supplied to the combustion chamber by a larger proportion than the amount of the lubricating oil to be supplied to the combustion chamber by way of the intake passage.

3. An engine lubricating system as defined in claim 2 in which said metering oil pump is provided with a main oil outlet communicated with a first oil supply passage through which the lubricating oil is supplied to the intake passage to be supplied to the combustion chamber therethrough, and an auxiliary oil outlet communicated with a second oil supply passage through which the lubricating oil is directly supplied to the combustion chamber, and said lubricating oil supply rate correction means controls the amount of the lubricating oil to be supplied to the second oil supply passage through the auxiliary oil outlet according to the engine speed, thereby correcting the amount of the lubricating oil to be supplied to the combustion chamber per unit engine revolution.

4. An engine lubricating system as defined in claim 2 in which said metering oil pump comprises a pair of plungers which are rotated in synchronization with the engine output shaft, one for supplying the lubricating oil to the combustion chamber by way of the intake passage and the other for supplying the lubricating oil directly to the combustion chamber, a control pin having a pair of cams against which the plungers respectively abut, and an actuator which moves the control pin to change the portions on the respective cams at which the plungers abut against the cams so that the strokes of the respective plungers are changed according to the engine load and the engine speed.

5. An engine lubricating system as defined in claim 1 in which said lubricating oil is supplied to the combustion chamber directly and by way of an intake passage, and there is provided means for increasing the amount of the lubricating oil to be directly supplied to the combustion chamber when the engine is to be accelerated.

6. An engine lubricating system as defined in claim 1 in which said metering oil pump comprises a plunger which is rotated in synchronization with the engine output shaft, a control pin having a cam against which the plunger abuts, and an actuator which moves the control pin to change the portion on the cam at which the plunger abuts against the cam so that the stroke of the plunger is changed according to the engine load and the engine speed.

7. An engine lubricating system as defined in claim 6 in which said metering oil pump comprises a pair of plungers which are rotated in synchronization with the engine output shaft, one for supplying the lubricating oil to the combustion chamber by way of the intake passage and the other for supplying the lubricating oil directly to the combustion chamber, a control pin having a pair of cams against which the plungers respectively abut, and an actuator which moves the control pin to change the portions on the respective cams at which the plungers abut against the cams so that the strokes of the respective plungers are changed according to the engine load and the engine speed.

8. An engine lubricating system as defined in claim 6 in which said actuator is provided with means for rotating the cam according to the throttle opening thereby changing the stroke of the plunger according to the engine load.

9. An engine lubricating system as defined in claim 1 in which said metering oil pump comprises a plunger which is rotated in synchronization with rotation of the engine output shaft, a control pin having a cam which has a continuously changing shape and is adapted to abut against the plunger, and an actuator which moves the control pin to change the portion on the cam at which the plunger abuts against the cam so that the stroke of the plunger is continuously changed thereby changing the amount of the lubricating oil to be supplied to the combustion chamber, and the actuator comprises a stepping motor for driving the control pin, detecting means for detecting the engine load and the engine speed, and a control means which outputs a signal for controlling the stepping motor to continuously increase the amount of the lubricating oil to be supplied to the combustion chamber per unit engine revolution as the engine load is increased and as the engine speed is increased.

10. An engine lubricating system as defined in claim 9 in which said cam has a cross section which continuously changes in the axial direction and said stepping motor axial moves the control pin to change the stroke of the plunger.

11. An engine lubricating system as defined in claim 10 in which said stepping motor has an output shaft which moves in the axial direction of the control pin to move the control pin in the axial direction to change the stroke of the plunger.

12. An engine lubricating system as defined in claim 11 in which said output shaft of the stepping motor moves the control pin in the axial direction to elongate the stroke of the plunger, and the control pin is moved in the axial direction to shorten the stroke of the plunger under the force of a resilient means.

13. An engine lubricating system in which a measured amount of lubricating oil is supplied to the combustion chamber of an engine by a metering oil pump so that a larger amount of lubricating oil is supplied to the combustion chamber when the engine load is heavy than when the engine load is light, characterized by having a lubricating oil supply rate correction means which nonlineraly increases the amount of the lubricating oil supplied to the combustion chamber with respect to engine r.p.m. and load so that the amount of oil supplied per unit engine revolution is greater (a) at high engine speed than at low engine speed and (b) at heavy engine load than at light engine load.

14. An engine lubricating system as defined in claim 13 in which said metering oil pump is adapted to supply the lubricating oil at a predetermined timing with respect to an engine revolution.

* * * * *